United States Patent [19]

Austin

[11] Patent Number: 5,508,091
[45] Date of Patent: Apr. 16, 1996

[54] TRANSPARENT ELECTRODES FOR LIQUID CELLS AND LIQUID CRYSTAL DISPLAYS

[75] Inventor: R. Russel Austin, Novato, Calif.

[73] Assignee: Photran Corporation, Lakeville, Minn.

[21] Appl. No.: 175,769

[22] Filed: Dec. 30, 1993

Related U.S. Application Data

[63] Continuation-in-part of Ser. No. 066,713, May 24, 1993, abandoned, which is a continuation-in-part of Ser. No. 985,287, Dec. 4, 1992, abandoned.

[51] Int. Cl.$^6$ .................................................. B32B 17/06
[52] U.S. Cl. ........................ 428/216; 359/359; 359/360; 359/580; 359/589; 428/432; 428/701; 428/702; 428/913
[58] Field of Search ........................ 428/701, 913, 428/702, 432, 216; 359/359, 360, 580, 589

[56] References Cited

U.S. PATENT DOCUMENTS

| | | | |
|---|---|---|---|
| 2,761,797 | 9/1956 | Young | 428/432 |
| 3,432,225 | 3/1969 | Rock | 350/164 |
| 3,569,509 | 2/1971 | Sulzbach | 350/164 |
| 3,960,441 | 6/1976 | Kamiya et al. | 350/164 |
| 4,422,721 | 12/1983 | Hahn et al. | 350/164 |
| 4,568,578 | 2/1986 | Arfsten et al. | 428/34 |
| 4,581,280 | 4/1986 | Tagichi et al. | 428/212 |
| 4,587,171 | 5/1986 | Hamano et al. | 428/448 |
| 4,710,433 | 12/1987 | Rowe et al. | 428/623 |
| 4,786,783 | 11/1988 | Woodward | 219/547 |
| 4,882,296 | 11/1989 | Hoheisel et al. | 437/184 |
| 4,965,121 | 10/1990 | Young et al. | 428/213 |
| 5,049,780 | 9/1991 | Dobrowolski et al. | 313/509 |
| 5,073,450 | 12/1991 | Iida | 428/336 |
| 5,085,926 | 2/1992 | Iida et al. | 428/216 |
| 5,091,244 | 2/1992 | Bionard | 428/216 |
| 5,105,310 | 4/1992 | Dickey | 359/586 |
| 5,147,125 | 9/1992 | Austin | 359/359 |
| 5,183,700 | 2/1993 | Austin | 428/216 |

*Primary Examiner*—A. A. Turner
*Attorney, Agent, or Firm*—R. Russel Austin

[57] ABSTRACT

A multilayer antireflection coating for a liquid cell three high refractive index layers and two low refractive index layers arranged alternatively with high refractive index layers outermost. The innermost high refractive index layer is formed from an electrically-conductive metal oxide material and may have an optical thickness between about one-tenth and three wavelengths of visible light. Thickness of each layer may be adjusted to provide lowest reflectivity. Alternatively layer thickness may be arranged such that if three layers of the coating are etched away to define an electrode coating, spectral response of the remaining two layers is the same as the original five layers.

3 Claims, 11 Drawing Sheets

TRANSPARENT ELECTRODES FOR LIQUID CELLS AND LIQUID CRYSTAL DISPLAYS

CROSS REFERENCE TO PRIOR APPLICATIONS

This application is a continuation-in-part of application Ser. No. 08/066,713, filed May 24, 1993, now abandoned, which in turn is a continuation-in-part of application Ser. No. 07/985,287, filed Dec. 4, 1992 and now abandoned.

TECHNICAL FIELD OF THE INVENTION

The present invention relates generally to transparent electrically-conductive coatings. It relates in particular to a transparent electrically-conductive multilayer coating for use as an electrode in electro-optical devices including cells containing an electrically responsive liquid, such as a liquid crystal material.

DISCUSSION OF BACKGROUND ART

Transparent electrically-conductive layers of metal oxides such as indium tin oxide (ITO), antimony doped tin oxide, and cadmium stannate (cadmium tin oxide) are commonly used as transparent electrodes in electro-optical devices such as liquid crystal displays. Recently, such transparent electrically-conductive have also been considered for use in switchable mirrors having variable reflectivity to adapt to varying lighting conditions.

A switchable mirror has the ability to change reflectivity in response to an applied electric field. Such a mirror is useful as a rear view mirror for a vehicle, as a vehicle operator may darken the mirror to reduce glare from lights of a following vehicle.

Such a mirror may be constructed, for example, by sandwiching a liquid crystal material between two glass sheets, forming, in effect, a liquid cell. One of the glass sheets is coated one side with a metal layer, such as silver or aluminum, to form a reflector. The other sheet is coated on one side with a transparent electrically-conductive layer. The sheets are sandwiched together with the coated sides toward the liquid crystal material. The metal layer and the transparent electrically-conductive layer form electrodes for applying an electric field to the liquid crystal material. The transparent electrically-conductive layer may be referred to as a transparent electrode. The metal layer may be referred to as a reflective electrode.

The above-described switchable mirror is normally used with the transparent electrode towards the vehicle operator. Because of this, the highly reflective mirror is viewed through the transparent electrode and the liquid crystal.

A problem that has been encountered in the design of switchable mirrors is that maximum brightness is limited by visible-light absorption in glass, transparent electrode, and the liquid crystal. Maximum brightness is also limited by reflection losses at optical interfaces between the glass, transparent electrode, and the liquid crystal. This causes the highest available reflectivity of such a mirror to be significantly less than a conventional rear-view mirror.

By way of example, a conventional rear view mirror has a reflectivity between about eighty and ninety percent. It has been found difficult, however, to construct switchable mirrors which have a maximum reflectivity greater than about seventy percent. Seventy percent is a generally accepted minimum standard reflectivity for vehicle rearview mirrors.

A liquid crystal display device also includes a liquid cell arrangement in which a liquid crystal material is sandwiched between two electrode-coated sheets. In a reflective display, the cell includes reflective and transparent electrodes as described above for the switchable mirror. In a transparent or back-lit display, a transparent electrode takes the place of the reflective electrode, i.e., both electrodes are transparent. In a liquid crystal display device reflection from electrode glass and liquid interfaces often contribute to reducing contrast and brightness of the display.

Absorption losses in materials of a switchable mirror or a display device may be minimized by appropriate material selection and processing. At best absorption losses may be reduced to an intrinsic level characteristic of the materials. Reflection occurs as a result of reflection caused by a refractive index (n) mismatch between the metal oxide material of the transparent electrode, the glass on which it is coated, and the liquid crystal material. Such reflection may range from a low of about two percent (for an electrode layer having an optical thickness of about one-half wavelength of visible light) to greater than ten percent (for an electrode layer having an optical thickness of two wavelengths or greater of visible light, or for an electrode layer having a thickness of one-quarter wavelength of visible light or less).

At first consideration, it may appear that, device cost permitting, losses in a transparent electrode system may be reduced by incorporating a transparent conductive layer as one layer in an optical interference layer system which forms, in effect, an antireflection coating between a glass substrate on which the layer system is deposited and the liquid crystal material. While apparently simple in concept there are particular aspects of the design and construction of liquid cells and liquid cell display devices which have limited the extent to which interference layer methods have been used to reduce reflection problems in transparent electrodes.

One problem is presented when a transparent electrode is required to have a very low sheet resistance, for example, on the order of one ohm per square (1 $\Omega$n/sq.) or less. Such a low sheet resistance may be required, for example, to reduce electrical losses in the layer or to allow the electrode to operate with a low voltage power supply, such as a battery. Low sheet resistance is often accomplished by providing a layer of a transparent conductive material which may have a thickness two to three wavelengths of visible light. ITO and fluorine doped tin oxide, both having a refractive index of about 2.0 for visible light, are believed to the most commonly used transparent conductive materials.

In the design of conventional antireflection coatings, it is a problem to accommodate a thick layer of a material having a refractive index of about 2.0 in the layer system of the coatings. This problem, and methods for at least partially solving the problem, are taught by Dickey in U.S. Pat. No. 5,105,310 and Austin in U.S. Pat. No. 5,147,125. The methods taught however appear to only be applicable if layers having a refractive index of about 2.0 have a thickness of one wavelength or less for visible light.

Transparent electrodes in display devices are typically disposed on a glass substrate in the form of a pattern. The pattern corresponds to numbers, characters, or designs, in the display. Forming electrodes in such patterns is usually accomplished by a coating a glass sheet with a continuous layer of a transparent electrically-conductive material and then etching away the electrically-conductive material where it is not required. Un-etched areas form the electrodes in the pattern and the electrodes are electrically isolated from each other by the etched areas. The etched and un-etched areas typically have a different reflectivity, and, more often than not, a different reflection color. Because of this, the electrode pattern is visible even when the device is not activated.

The reflection at a liquid glass interface is relatively low. Typically it may have a value between about 0.1 and 0.2 percent. The electrode visibility problem, however, may not be solved simply by reducing the reflection of the electrode to a low level as possible, as differences in small reflection values may still be detectable if the reflection (contrast) ratio between electrode and intervening areas is high, or if there is a perceptible color difference between the reflection colors in the electrode and intervening areas.

There is clearly a need to improvement optical properties of transparent electrodes for electro-optical liquid cell devices such as switchable mirrors and display devices.

SUMMARY OF THE INVENTION

The present invention is directed in general to providing improved transparent electrodes for use in liquid cells. In one aspect, the present invention is directed to providing an electrodes which has very low photopic reflection, to minimize optical losses in a device including the electrode. In another aspect, the present invention is also directed to providing a transparent conductive coating which may be etched to form an electrode pattern, while minimizing reflection or color differences between etched and un-etched areas.

In one embodiment of the present invention, the coating, or layer system, comprises five layers, designated the first, second, third, fourth, and fifth in consecutive numerical order, beginning with the layer furthest from the substrate. The first and fifth layers each include a transparent material having a refractive index between about 1.62 and 2.65 at a wavelength of about 520 nanometers (nm). The second and fourth layers each include a material having a refractive index between about 1.35 and 1.62 at a wavelength of about 520 nm.

The first and second layers each have a thickness greater than about one-sixteenth of a wavelength of visible light and have a combined optical thickness of less than about one-quarter wavelength of visible light. The fourth and fifth layers also each have an optical thickness greater than about one-sixteenth wavelength of visible light and have a combined optical thickness of less than about one-quarter wavelength of visible light.

The third layer has a predetermined optical thickness between about one-sixteenth wavelength and three wavelengths of visible light, and includes an electrically-conductive metal oxide material having a refractive index between about 1.8 and 2.2 at a wavelength of about 520 nm.

The electrically-conductive metal oxide material is preferably a material selected from the group consisting of indium tin oxide, cadmium tin oxide, antimony doped tin oxide, and aluminum doped zinc oxide.

The first and fifth layers preferably include a material selected from the group consisting of tin oxide Silicon nitride ($Si_xN_y$), titanium dioxide ($TiO_2$), tin oxide ($SnO2$) and tantalum oxide ($Ta_2O_5$) The second and fourth layers preferably include silicon dioxide.

The coating may have a sheet resistance between about two and two-hundred ohms per square, and may provide a photopic reflectivity less than about 0.25 percent. It may be embodied in a substrate including a surface having a plurality of spaced apart transparent electrodes arranged thereon. The coated surface is used in contact with an electrically responsive liquid such as a liquid crystal material. Electrodes are separated by insulating areas.

In this embodiment an insulating coating is deposited on the substrate for forming the insulating areas. The insulating coating is formed from a first group of layers and has a first spectral response in a the liquid. Each of the electrodes is formed from a second group of layers deposited on the first group of layers and has a second spectral response in the liquid.

The second group of layers includes at least three layers and the first group of layers includes at least one layer. Each of the layers in the first and second groups having an extinction coefficient less than 0.10 at about 520 nm. Any adjacent two of the layers in either the insulating or electrode areas have a different refractive index;

The three layers of the second group include a first layer furthest from the substrate and have a refractive index between about 1.62 and 2.65 at a wavelength of about 520 nm. A second layer adjacent the first layer has a refractive index between about 1.35 and 1.62 at a wavelength of about 520 nm. A third layer of an electrically-conductive metal oxide material has a refractive index between about 1.8 and 2.2 at a wavelength of about 520 nm and has an optical thickness between about one-sixteenth and one wavelength of visible light.

The one layer of said first group has a refractive index less than the refractive index of the third layer of the first group. The first and second layers of the second group each have an optical thickness less than one-quarter wavelength of visible light and have a combined optical thickness less than about one-quarter wavelength of visible light. Thicknesses of the layers in the first and second groups is selected such that the first and second spectral responses in the liquid substantially match in a wavelength range between about 470 and 650 nm.

When the first group of layers has only one layer and the second group of layers has only three layers the one layer of the first group preferably has a refractive index between the refractive index of the conductive transparent layer and the refractive index of the substrate.

In other, non-exhaustive, embodiments, the second group of layers has only three layers and includes an electrically conductive metal oxide layer in contact with the first group of layers. The first group of layers may have two, three, or four layers with the layer furthest from the substrate having a refractive index less than the refractive index of the conductive layer of the second group.

The above discussed plurality of electrodes may be pattern formed by depositing the second group of layers as a continuous coating over the first group of layers, and etching away the second group of layers in areas which are to form the insulating areas. Etching may be accomplished by any well-known method such as acid etching or ion milling.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

DESCRIPTION OF PREFERRED EMBODIMENTS

Before proceeding with a detailed description of preferred and other embodiments of the present invention, it is useful to state here that all examples of coatings in accordance with the present invention described below are intended to be used when immersed in or in optical contact with a liquid having a refractive index of about 1.3 or greater at a wavelength of about 520 nm.

Where a spectral response is referred to, that spectral response is the reflection spectral response of the coating (or some portion thereof) in the liquid. This is the case whether or not it is explicitly stated in the text. Where color coordinates are specified, these are reflection color coordinates.

Coatings are referred to interchangeably as transparent electrically-conductive coatings or transparent electrodes. The structure of any particular example may be referred to as the layer system of the particular example. In the following description thickness of layers in the coatings is specified in terms of either optical thickness (in fractional light wavelengths) or physical thickness (in nanometers) the manner of converting from one to the other is well known to those familiar with the optical coating art.

The optical design principles for the coatings discussed below are intended to be applicable to materials having a relatively low absorption for visible light, characterized here by an extinction coefficient (k) less than about 0.01 at a wavelength of 520 nm. Layers having such low absorption are often referred to by practitioners of the optical coating art as dielectric materials, whether they actually are or not. These materials have a range of practical values of refractive index between about 1.35 and 2.65.

All layers specified for coatings in accordance with the present invention, when vacuum deposited by established methods such as sputtering or evaporation, may have a value of k less than 0.01 at a wavelength of about 520 nm. This is true even of the electrically-conductive metal oxide materials. Such metal oxide materials clearly are not dielectrics, but for optical design purposes they can be designed into coatings for visible light in exactly the same manner as dielectric materials.

Prior art transparent electrically-conductive coatings sometimes include one or more layers of a metal, for example silver or gold, or a transition metal nitride such as titanium nitride. These layers are characterized by having values of k of 1.0 or greater. For most metals the value of k is greater than the value of n at 520 nm. It is emphasized here that design principles of coatings of the present invention, discussed in detail below, are not applicable to coatings including a metal or nitride layers.

Figure 1:
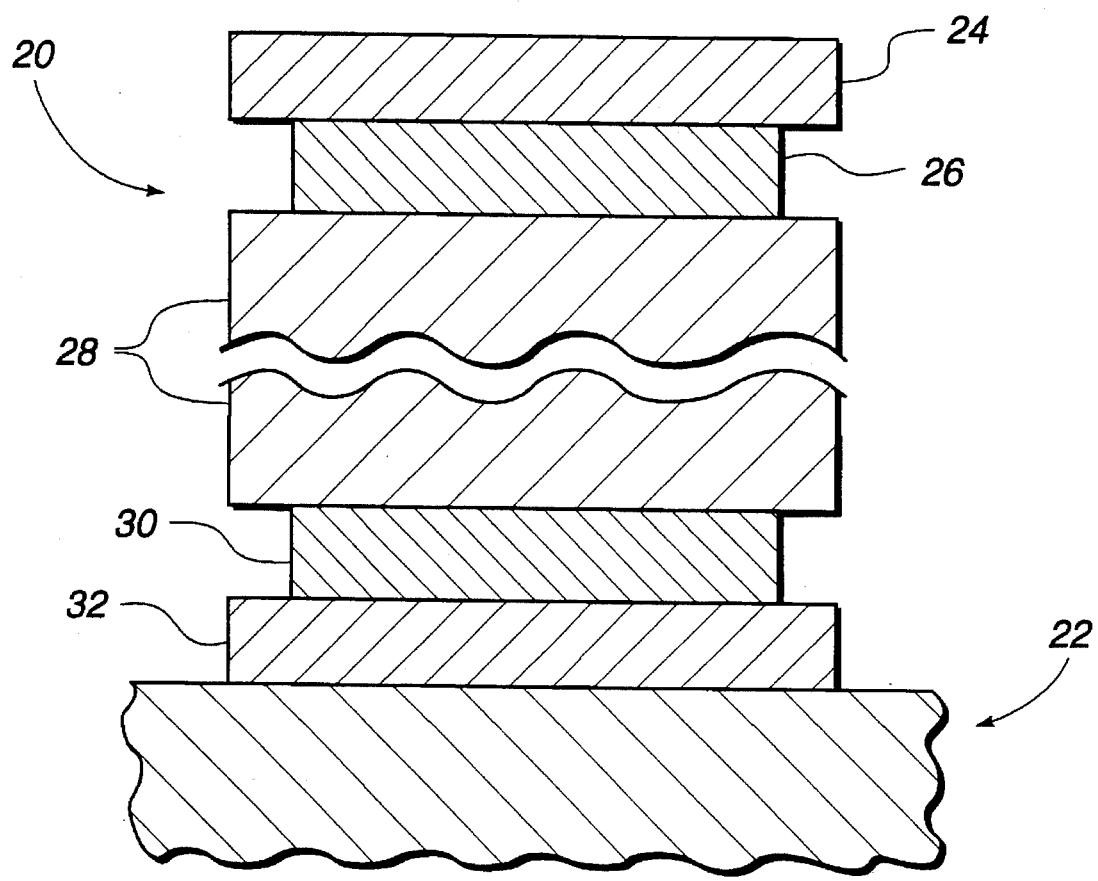
FIG. 1 schematically illustrates structure of one embodiment of a five-layer electrically-conductive transparent coating in accordance with the present invention.

Turning now to the drawings, wherein like components are designated by like reference numerals, a preferred embodiment of the present invention is illustrated in FIG. 1. Here, a coating or layer system 20, comprising a system of five layers, is deposited on a substrate 22, generally a glass substrate. Any adjacent two of the layers have a different refractive index. A first layer 24 has a refractive index between about 1.62 and 2.65. Preferably, first layer 24 has a refractive index between about 1.62 and 2.2 at a wavelength of about 520 nm.

A second layer 26 has a refractive index between about 1.35 and 1.62. Layers 26 and 24 each have an optical thickness greater than one-sixteenth of a wavelength of visible light. The combined optical thickness of layers 24 and 26 is less than about one-quarter wavelength of visible light. Visible light is generally regarded as occupying a wavelength region or spectrum between about 425 nm and about 675 nm. Generally, a wavelength of about 520 nm is regarded as about the center of the visible light spectrum. This wavelength is often used as a convenient wavelength point for specifying refractive index and extinction coefficient of materials. A visible light wavelength for determining layer thickness may be selected at any wavelength within the visible spectrum. It may be selected, for example, based on the region of the spectrum in which low reflection is most important.

A third layer 28 is a layer of an electrically-conductive metal oxide material. The electrically-conductive metal oxide material is preferably selected from the group consisting of indium tin oxide, cadmium tin oxide, antimony doped tin oxide, fluorine doped tin oxide, and aluminum doped zinc oxide. Such materials generally have a refractive index between about 1.8 and 2.2 at a wavelength of about 520 nm.

Third layer 28 may have an optical thickness between about one-sixteenth wavelength and three wavelengths of visible light. Selection of the thickness of layer 28 is based on a desired sheet resistance value for the layer, and a desired minimum reflectivity for coating 20. Layer thickness selection for all layers in coating 20 is described in detail below.

A fourth layer 30 has a refractive index between about 1.35 and 1.62 at a wavelength of about 520 nm, and a fifth layer 32 has a refractive index between about 1.62 and 2.65, preferably between about 1.62 and 2.2, at a wavelength of about 520 nm. Layers 30 and 32 each have an optical thickness greater than about one-sixteenth of a wavelength of visible light. The combined optical thickness of layers 30 and 32 is less than about one-quarter wavelength of visible light.

A preferred method for depositing the layer system of coating 20 would be DC reactive sputtering in in-line sputter deposition apparatus. Such a method may permit the coating to be deposited economically without significantly, if at all, compromising optical performance of the coating. It will be appreciated by those familiar with the art to which the present invention pertains, however, that optical principles of the present invention are applicable whatever the deposition method used to form layers of the layer system.

For DC reactive sputtering, layers 26 and 30, which may be described as low refractive index layers, are preferably formed from silicon dioxide which has a refractive index of about 1.46 at wavelength of about 520 nm. Layers 24 and 32, which may be described as high refractive index layers, are preferably formed from a material selected from the group consisting of silicon nitride, titanium oxide, tantalum oxide and tin oxide. Materials in this group generally have a refractive index between about 1.8 and 2.2 at a wavelength of about 520 nm.

Selection of an approximate layer thickness for layer 28 is generally based on a desired value of sheet resistance for coating 20. A layer having an optical thickness of about one-half wavelength of visible light, formed from the above-suggested group of materials for layer 28, may have a sheet resistance between about 5 Ω/sq. and 100 Ω/sq. A one-half wavelength thick layer of ITO has a physically thickness of about 120 nm. The actual sheet resistance value obtained for a layer will be dependent on layer material, and the process used to deposit the layer. Further, it is well known that in any given process, sheet resistance values may be dependent on process parameters such as layer deposition rate, process materials, and the like. Generally, for any one set of process and deposition conditions, the sheet resistance will decrease with increasing layer thickness.

ITO layers having a thickness of about 120 nm and a sheet resistance of 10 Ω/sq. or less were produced by DC sputtering ITO from an ITO target at a power of about 0.25 Kilowatts (KW) at a pressure between about four and five millitorr (mTorr) in a flowing mixture of about ten percent oxygen and ninety percent argon. Flow rate for the argon and oxygen mixture was between about 12 and 18 standard cubic centimeters per minute (sccm). After deposition the layers were annealed at a temperature of about one-hundred fifty degrees centigrade for about one hour.

Once an approximate layer thickness for layer 28 has been selected, based on sheet resistance considerations, a specific thickness for layer 28 and layers 24, 26, 30, and 32 may be selected using commercially available optical thin film computation software, for example, the MACLEOD suite of computer programs, available from the Thin Film Center of Tucson, Ariz. Such programs include a range of generally accepted optical property data for commonly used coating materials, and also include provisions to install additional optical property data for a user's own preferred materials. Such programs generally also include means for refining or optimizing layer thicknesses in a given layer system to meet specific performance criteria or target values. Generally, however, a basic starting point structure, and approximate refractive indices and thicknesses for a layer system must be known in order for the optimization process to be effective.

Set forth below in Tables 1–4 are examples of layer systems of transparent electrically-conductive coatings designed according to the principles of the present invention. The examples serve to indicate, in particular, how optical properties of the layer systems vary according to the thickness of layer 28, i.e., with the range of sheet resistance of layer 28 and thus of coating 20. In all of the examples, layer systems were optimized to provide lowest possible reflection at wavelengths between 425 nm and 675 nm, when immersed in a liquid having a refractive index of about 1.445. It was further assumed that layer 28 could be varied in thickness about a nominal thickness chosen to provide a predetermined sheet resistance, within a certain tolerance range. In all examples, layers are numbered according to their numerical order in the layer system, beginning with the layer furthest from a substrate on which the layer system is deposited. Tin oxide is used for the first and fifth layers, silicon dioxide is used for the second and fourth layers, and ITO is used for the third (electrically-conductive) layer.

Tin oxide has a refractive index of about 2.0 at a wavelength of about 520 nm, silicon dioxide has a refractive index of about 1.46 at a wavelength of about 520 nm, and ITO has a refractive index of about 2.0 at a wavelength of about 520 nm. As noted above, in the examples of Tables 1–4, it is assumed that the layer system is immersed in (in optical contact with) a medium having a refractive index of about 1.445, one probable refractive index value for a liquid crystal material. It is also assumed that the layer system is deposited on a substrate having a refractive index of about 1.52. Those skilled in the art will be able to design embodiments of the invention which may be effective with substrates other than glass, and with liquids having indices greater or less than 1.445.

Figure 2:
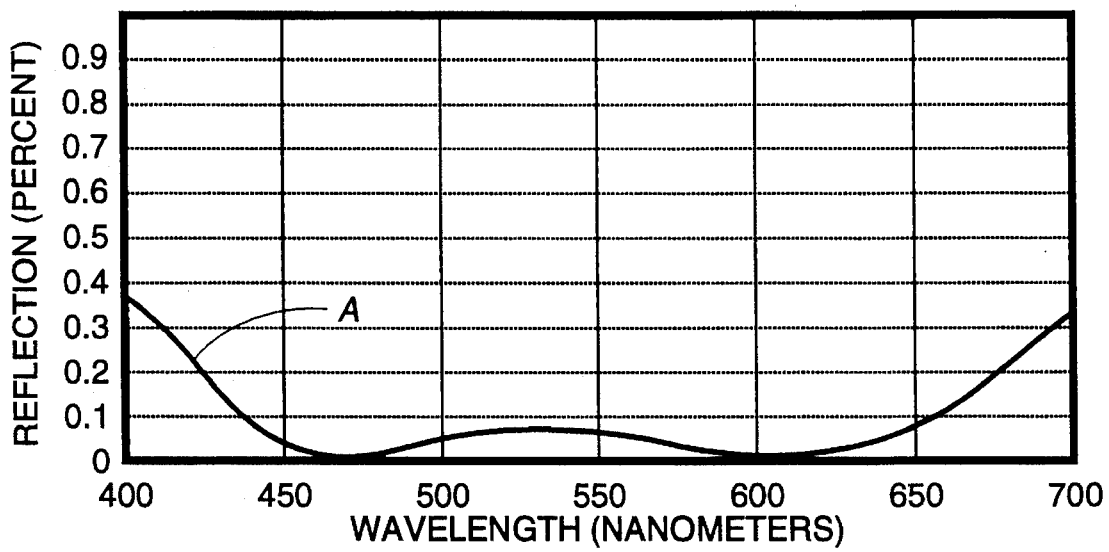
FIG. 2 is a graph illustrating computed reflection as a function of wavelength for the coating of FIG. 1, wherein the third layer has an optical thickness of about one-half wavelength of visible light.

Referring now to Table 1, a layer system is shown in which the thickness of layer 28 is about one-half wavelength of visible light, i.e., about 120 nm. Thickness of the layers in Table 1 and other tables below is given in terms of a physical thickness in nanometers as this is convenient for specifying layers for in-line sputter deposition. Physical thickness may be converted to optical thickness by multiplying the physical thickness by the refractive index of the material of the layer. Computed reflection as a function of wavelength for the layer system of Table 1 is illustrated in FIG. 2 (Curve A). The photopic reflectivity represented by curve A is about 0.04%.

TABLE 1

| Layer No. | Material | Thickness |
|---|---|---|
| 1 | $SnO_2$ | 21.9 nm |
| 2 | $SiO_2$ | 27.5 nm |
| 3 | ITO | 120.5 nm |
| 4 | $SiO_2$ | 20.5 nm |
| 5 | $SnO_2$ | 24.1 nm |

In Table 2, a layer system is described in which the third layer has an optical thickness of about one wavelength of visible light. Such a layer would have a sheet resistance of about one-half of the sheet resistance of layer number 3 of Table 1, assuming deposition parameters were similar.

Figure 3:
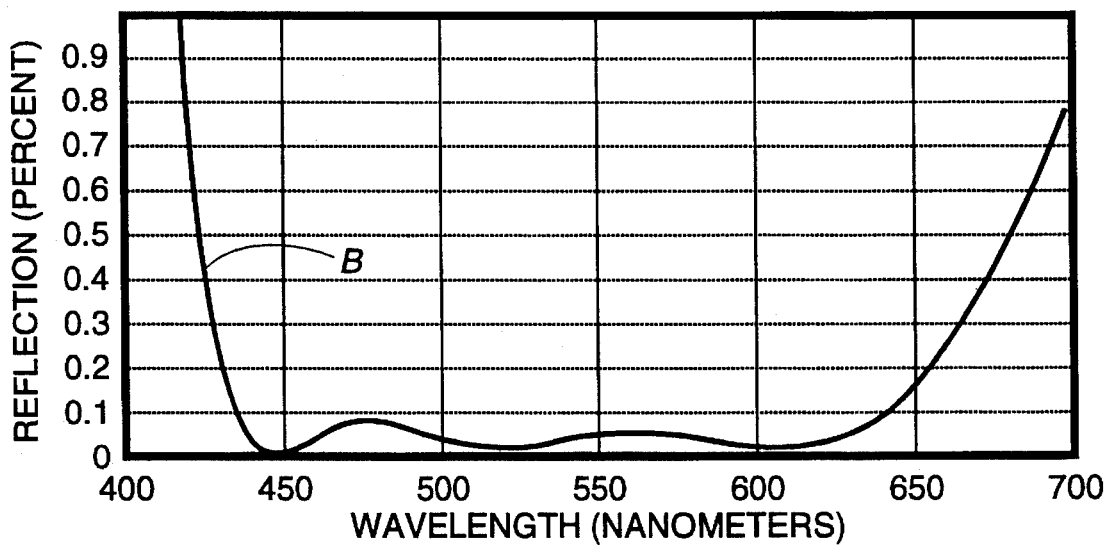
FIG. 3 is a graph illustrating computed reflection as a function of wavelength for the coating of FIG. 1, wherein the third layer has an optical thickness of about one wavelength of visible light.

Computed reflection as a function of wavelength for the layer system of Table 2 is illustrated in FIG. 3 (Curve B). The photopic reflection represented by Curve B is about 0.04%.

TABLE 2

| Layer No. | Material | Thickness |
|---|---|---|
| 1 | $SnO_2$ | 27.1 nm |
| 2 | $SiO_2$ | 26.0 nm |
| 3 | ITO | 264.0 nm |
| 4 | $SiO_2$ | 23.8 nm |
| 5 | $SnO_2$ | 24.1 nm |

Referring now to Table 3, a layer system is shown in which the third layer has an optical thickness of about two-and-one-eighth wavelengths of visible light.

Figure 4:
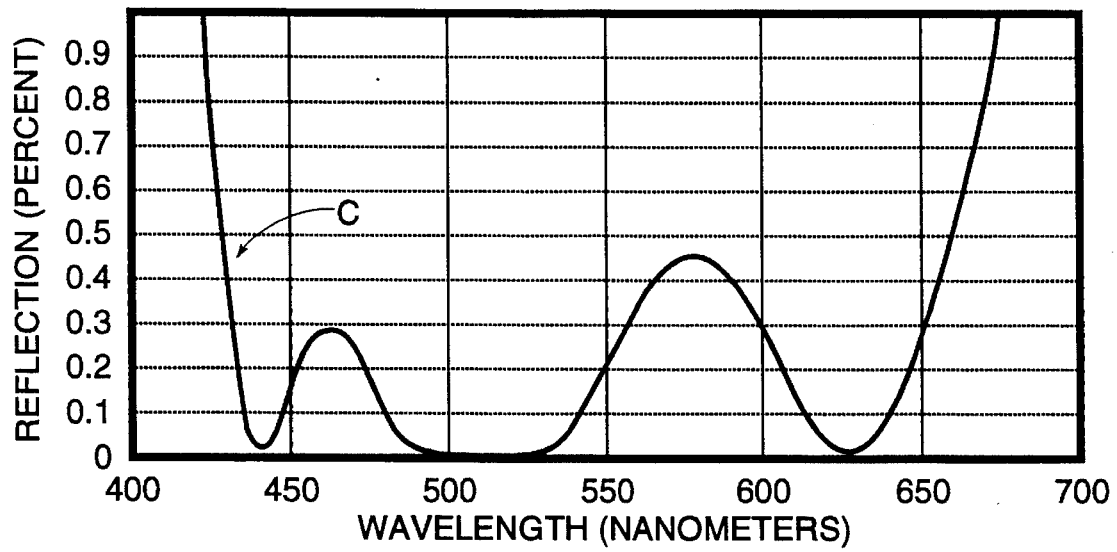
FIG. 4 is a graph illustrating computed reflection as a function of wavelength for the coating of FIG. 1, wherein the third layer has an optical thickness between about two and two-and-one-quarter wavelengths of visible light.

The computed reflection as a function of wavelength is illustrated in FIG. 4 (Curve C). It can be seen that as a result of increasing the thickness of the third layer, reflection varies considerably across the visible spectrum, from minimum values of close to zero at wavelengths of about 440 nm, 510 nm, and 630 nm, to peaks of about 0.3% and 0.45% at wavelengths of about 460 nm and 580 nm respectively. Nevertheless, Curve C represents a photopic reflectivity of about 0.2% which compares favorably with reflection values achieved for conventional anti-reflection coatings for reducing reflection from air/glass interfaces in camera lens elements, spectacle lens elements, and the like.

Turning now to Table 4, a layer system is shown in which the third layer has an optical thickness of about two and one-half wavelengths of visible light. The system of Table 4 was derived from the system of Table 3 by increasing the layer thickness of Layer 3 in Table 3 by an amount equal to about one-quarter wavelength of visible light, prior to initiating computer optimization.

TABLE 3

| Layer No. | Material | Thickness |
|---|---|---|
| 1 | $SnO_2$ | 27.5 nm |
| 2 | $SiO_2$ | 24.8 nm |
| 3 | ITO | 574.0 nm |
| 4 | $SiO_2$ | 19.7 nm |
| 5 | $SnO_2$ | 31.1 nm |

TABLE 4

| Layer No. | Material | Thickness |
|---|---|---|
| 1 | $SnO_2$ | 27.3 nm |
| 2 | $SiO_2$ | 26.7 nm |
| 3 | ITO | 643.0 nm |
| 4 | $SiO_2$ | 21.7 nm |
| 5 | $SnO_2$ | 30.4 nm |

Figure 5:
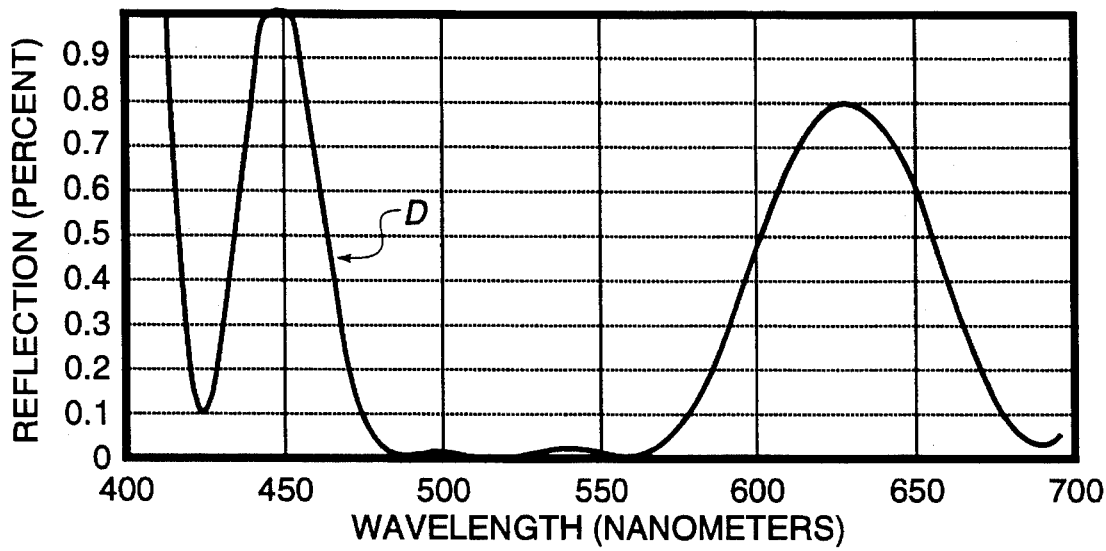
FIG. 5 is a graph illustrating computed reflection as a function of wavelength for the coating of FIG. 1, wherein the third layer has an optical thickness of about two-and-one-half wavelengths of visible light.

The computed reflection as a function of wavelength for the layer system of table 4 is illustrated in FIG. 5 (Curve D). It can be seen that the system provides a broad region of near zero reflectivity between wavelengths of about 475 nm and 575 nm. The near zero reflection region is bounded on one side by a reflectivity peak of about 1.0% at a wavelength of about 450 nm, and, on the other side by a reflectivity peak of about 0.75% at a wavelength of about 630 nm. These peak values are higher than the peak values of FIG. 4. However, because of the relatively broad near-zero reflectivity region at the center of the visible spectrum, curve D represents a photopic reflectivity of about 0.16%, i.e., about twenty percent less than the reflectivity of curve C.

Calculations were undertaken to determine whether or not performance of an electrically conductive transparent coating according to the present invention may be improved by adding additional layers, without increasing the total thickness of the layer system.

Figure 6:
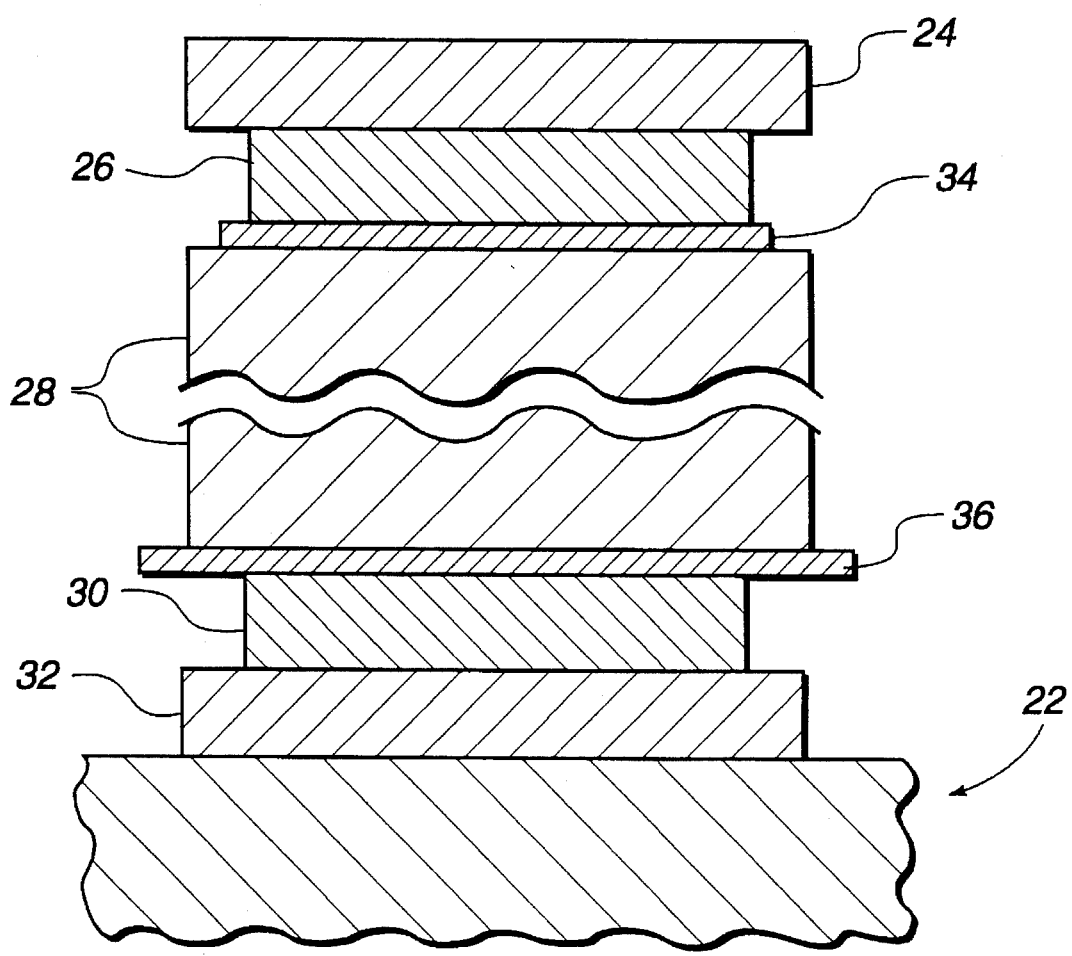
FIG. 6 schematically illustrates one example of a seven-layer electrically-conductive transparent coating in accordance with the present invention.

Referring now to FIG. 6, one method of providing a layer system 21 including additional layers, without increasing the total thickness of a layer system, would be to provide a first additional layer 34 between second and third layers 24 and 26 of the system of FIG. 1, and a second additional layer 36 between third and fourth layers 30 and 32 of FIG. 1 such that the combined thickness of layers 24, 26, and 34, and the combined optical thickness of layers 36, 30, and 32 was less than one-quarter wavelength of visible light. Layer systems according to FIG. 2 were investigated wherein additional layers 34 and 36 were each high refractive index layers having a refractive index different from the refractive index of layer 28. In each example the computer optimization process simply reduced the thickness of additional layers until their optical thickness was near zero or optically insignificant, yielding a photopic reflection value for the system which would have been the same were they not present. In practical systems, however, such additional layers may be found useful, for example, for promoting adhesion between low index layers 26 and 30 and conductive transparent layer 28. The layers may have a refractive index between about 1.62 and 2.65 at a wavelength of about 520 nm. Such layers are often termed adhesion layers or boundary layers by practitioners of the art. Such practitioners will realize, without further illustration, that use of such layers is not limited to the example illustrated in FIG. 6, but may be applied, in the same position with respect the third layer of the coating, to any other examples of coatings of the present invention described herein. Accordingly no further illustration of boundary layers is presented herein.

The foregoing discussion has been directed to a transparent electrode for a liquid cell type device, such as a switchable mirror, wherein the entire electrode area is used. In a display device, electrodes usually take the form of numbers, characters, or designs in the display. The electrodes are typically formed by etching a continuous electrode layer to form individual electrode elements of the display.

A problem with etched electrode patterns is that at least the photopic reflectivity of etched an un-etched portions of the display is typically different. Because of this, an electrode pattern in a display is frequently detectable even if the display is not activated. Under certain conditions, for example, when bright light is incident on a display, detectability of the electrode pattern may be sufficient that activated and inactivated portions of the display are difficult to distinguish. This may seriously compromise readability of the display.

Figure 7A:
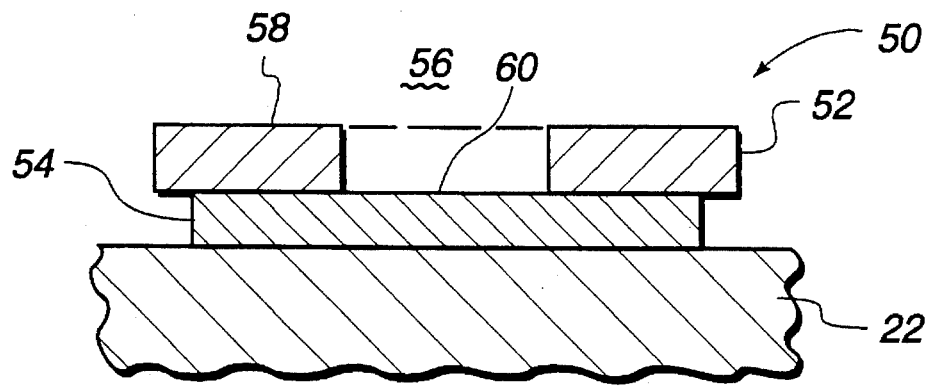
FIG. 7A schematically illustrates etched and un-etched portions of a transparent electrode including a layer of ITO deposited on a barrier layer of $SiO_2$.
Figure 7B:
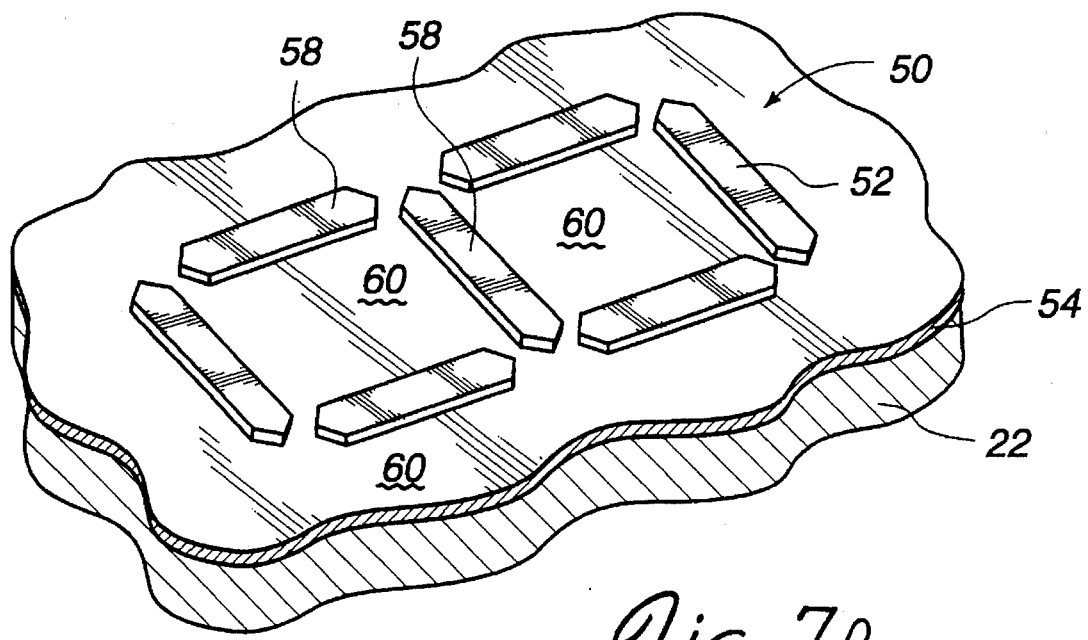
FIG. 7B is a fragmentary perspective view schematically illustrating an electrode pattern for forming figures or characters.

Referring now to FIGS. 7A and 7B, a simple prior art electrode configuration for a display is illustrated. Here an electrode 50 is formed from a single layer 52 of a conductive transparent material deposited on a barrier layer 54. Barrier layer 54 is deposited on a substrate 22. For a relatively small display, such as the display of a watch or a calculator, conductive transparent layer 52 may be a layer of ITO having a thickness of about 25.0 nm and barrier layer 54 may be a layer of silicon dioxide having a thickness of about 25.0 nm. In use, electrode 50 is immersed in a liquid crystal material 56 which may have a refractive index between about 1.3 and 1.7. Typically, when an electrode pattern is etched in such an electrode arrangement to form a display, only transparent conductive layer 52 is etched and barrier layer 52 is left intact (see FIG. 8A). In such a display an un-etched area 58 (see FIG. 8B) will include layers 52 and 54 and an etched area 60 will include only layer 54.

Figure 8:
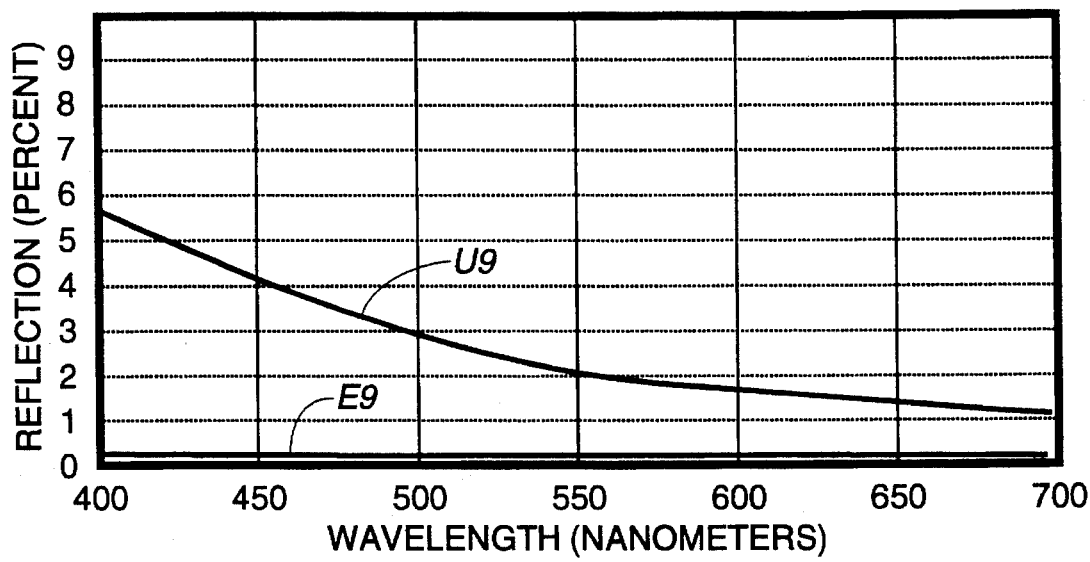
FIG. 8 is a graph schematically illustrating computed reflection as a function of wavelength for the etched an un-etched portions of the transparent electrode of FIG. 8A.

Referring now to FIG. 8, the computed spectral response (reflection versus wavelength) of layers 52 and 54 in liquid 56 is shown as curve U9. Here, layer 52 is assumed to be a layer of ITO having a thickness of 25.0 nm and barrier layer 54 is assumed to be a layer of silicon dioxide having a thickness of 25.0 nm. The computed spectral response in liquid 56 of layer 54 alone (etched area 60) is illustrated by curve E9.

It is evident from a comparison of curves U9 and E9 that the etched an un-etched areas of a display including electrode 50 would be readily detectable, due to a reflectivity ratio which may be as high as ten, or even greater. Electrode 50 does not include any measures for reducing reflectivity, and the reflectivity of un-etched area 58 of the display is higher than the reflectivity of etched area 60 of the display. In addition, it should be noted that curve E9 is indicative of an almost neutral reflection color, while curve U9 is indicative of a blue reflection color. This would further contribute to electrode detectability.

Figure 9:
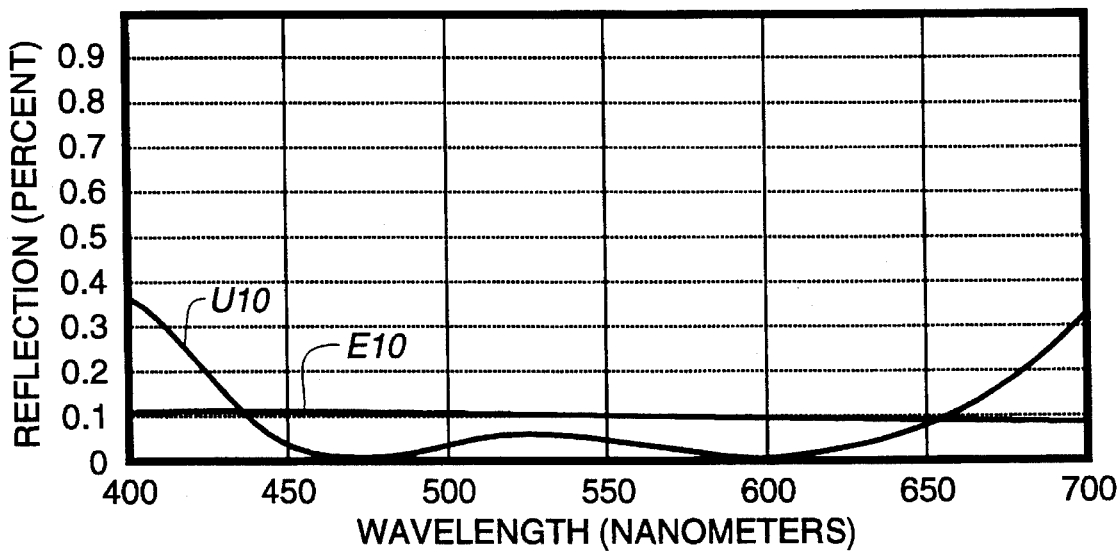
FIG. 9 is a graph schematically illustrating computed reflection as a function of wavelength for the coating of FIG. 2 and for an uncoated substrate.

As discussed above, the coating of the present invention provides for a conductive transparent electrode which may have very low reflection losses, for example, less than 0.25 percent. In certain examples described below reflectivity may be less than 0.10 percent. Providing a low reflection electrode alone, however, may not be sufficient to cause the electrode to be undetectable in the from of an electrode pattern on a substrate. This is illustrated in FIG. 9 wherein the spectral response (curve U10) of the coating of Table 1, in a liquid having a refractive index of about 1.445, is shown together with the spectral response (curve E10) of the substrate alone in the liquid. Here, while the reflection of the coating (the electrode) is very low, a significant photopic reflection ratio (about 2:1) exists between the substrate and the coating.

In order to really ensure that an electrode pattern is essentially undetectable it is not only advisable to have the photopic reflectivity of etched and un-etched areas of a display substantially equal, but also to have the reflection color of the areas match. An electrode pattern would probably be detectable by reason of a color difference between etched an un-etched areas even if the areas had an identical photopic reflectivity or photopic brightness.

In conditions where extremely low reflection in an electrode is not of paramount importance, the coating of the present invention may be readily configured to provide an electrode pattern in which electrodes are essentially undetectable. Further this may be accomplished while providing an effective barrier layer on a substrate on which the coating is deposited. Illustrative examples are set forth below.

Figure 10:
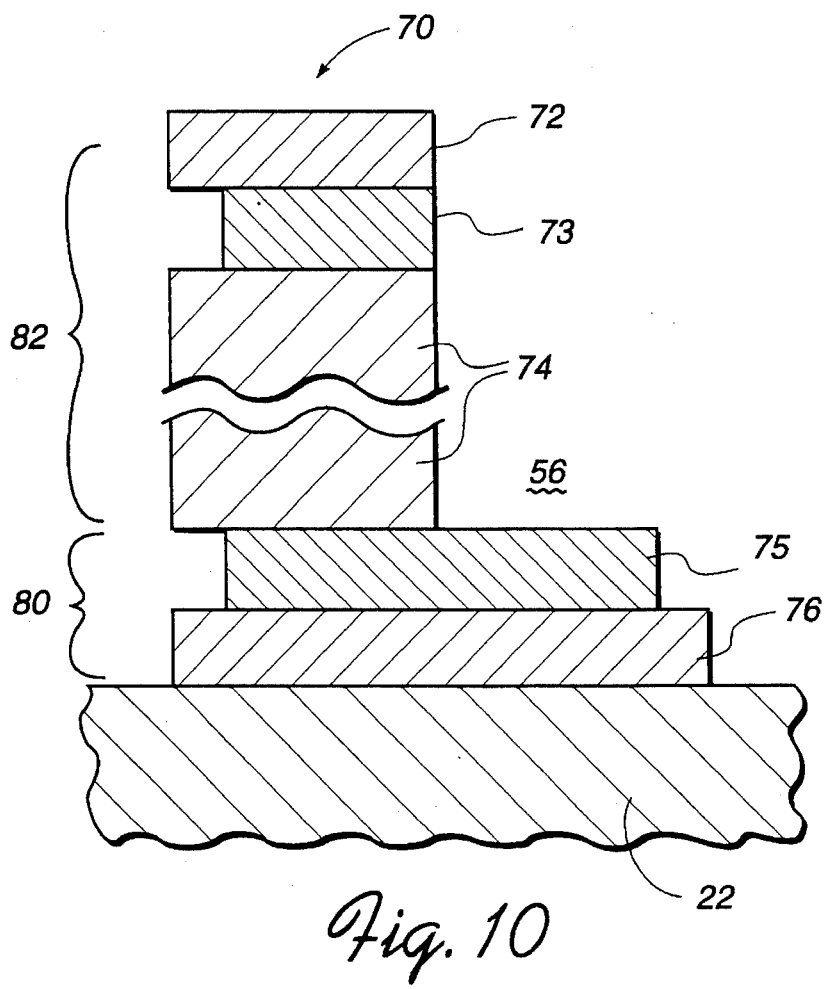
FIG. 10 schematically illustrates etched and un-etched portions of another embodiment of a five-layer coating in accordance with the present invention.

Turning now to FIG. 10, a five-layer embodiment 70 of a transparent electrically-conductive coating in accordance with the present invention is illustrated. The coating includes first through fifth layers 72–76 respectively. The coating is designed for use when immersed in liquid 56.

Layers 75 and 76 may be referred to as a group of layers 80 for forming a diffusion barrier to prevent material from substrate 22 from diffusing into other layers of the coating.

Layers 72–74, deposited on group 80, may be referred to as an electrode forming group 82. Layer 74 is formed from an electrically conductive transparent material. When coating 70 is etched to form an electrode pattern, it will be necessary to etch away at least layers 72–74 (group 82) in order that etched areas are not electrically-conductive. In practice, it will probably be found convenient to etch away precisely these three layers.

Layers 72–76 may be specified generally as follows. Layer 72 located furthest from the substrate has a refractive index between about 1.62 and 2.65 at a wavelength of about 520 nm. Layer 73, located adjacent layer 72 has a refractive index between about 1.35 and 1.62. Layers 72 and 73 each have an optical thickness greater than one-sixteenth wavelength of visible light and have a combined optical thickness of less than one-quarter wavelength of visible light.

As noted above, layer 74 is a layer of an electrically-conductive transparent material having a refractive index between about 1.8 and 2.2 at a wavelength of about 520 nm. The material is preferably selected from the group consisting of indium tin oxide, cadmium tin oxide, antimony doped tin oxide, and aluminum doped zinc oxide. Layer 74 has an optical thickness between about one-tenth and three wavelengths of visible light, and preferably between about one-tenth wavelength and one wavelength of visible light.

Layer 75, located furthest from the substrate in group 80 has a refractive index, less than the refractive index of layer 74 and preferably between about 1.35 and 1.62 at a wavelength of about 520 nm. Layer 76 has a refractive index between about 1.62 and 2.65. Layers 75 and 76 each have an optical thickness greater than one-sixteenth of a wavelength of visible light and have a combined optical thickness less than about one-quarter wavelength of visible light.

In Table 5 are shown details of the layer structure of coating 70 if the coating is optimized to provide lowest possible reflection when immersed in a liquid having a refractive index of about 1.62. First and fifth layers 72 and 76 are here assumed to be formed from silicon nitride having a refractive index of about 2.14 at a wavelength of about 520 nm. Second and fourth layers 73 and 75 are assumed to be formed from silicon dioxide. Third layer 74 is assumed to be formed from ITO. Liquid 56 is assumed to have a refractive index of about 1.62 at about 520 nm.

TABLE 5

| Layer No | Material | Thickness |
| --- | --- | --- |
| 1 | $Si_xN_y$ | 16.0 nm |
| 2 | $SiO_2$ | 24.7 nm |
| 3 | ITO | 141.5 nm |
| 4 | $SiO_2$ | 30.5 nm |
| 5 | $Si_xN_y$ | 16.1 nm |

Figure 11:
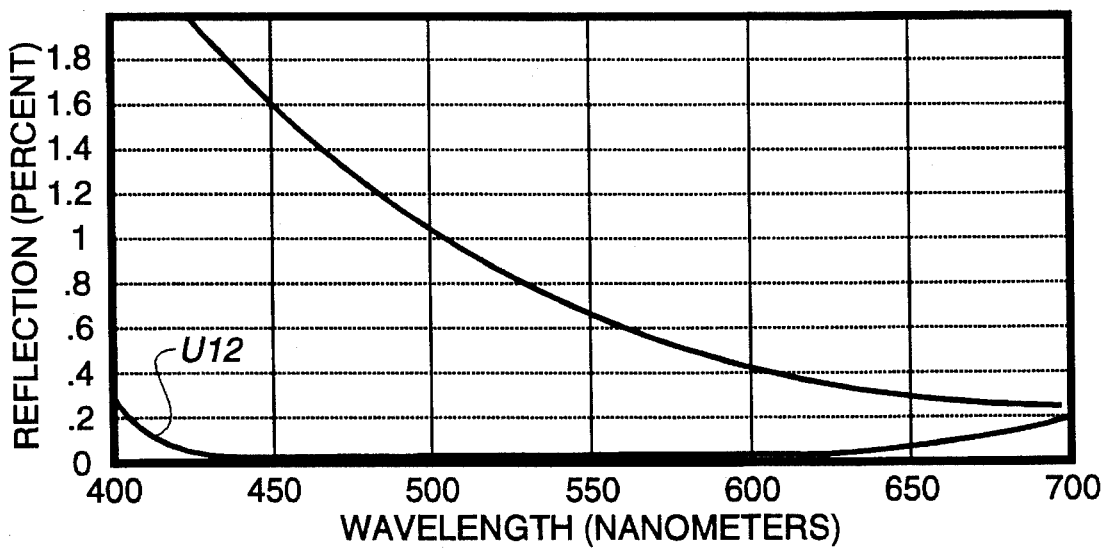
FIG. 11 is a graph schematically illustrating computed reflection as a function of wavelength for the etched an un-etched portions of one example of the coating of FIG. 11 wherein the coating is configured to provide minimum reflection for visible light.

In FIG. 11 is shown the reflection as a function of wavelength (curve U12) for groups 80 and 82 in combination, and for group 80 (curve E12) alone. The relatively high reflection of the fourth and fifth layers alone is due primarily to fifth layer 76. It has been determined that by reducing the thickness of this layer and increasing the thickness of the silicon dioxide layer (fourth layer 75) of Table 5, the photopic reflection of group 80 alone can be significantly reduced. It has further been determined that if the thickness of layers in group 80 is then fixed, the layers of group 82 may be arranged such that the spectral response (in liquid 56) of groups 80 and 82 together substantially match the spectral response (in liquid 56) of group 80 alone, at least over a wavelength region between about 470 nm and 650 nm. One criterion which may be used to determine if the spectral responses are substantially matched is that at any wavelength in a range between about 500 nm and 600 nm the reflection ratio between electrode (etched) areas and etched areas is between about 0.75 and 1.25.

In Table 6 are shown details of coating 70 modified in the above described manner. Note in particular that, among other layer thickness changes, the thickness of fifth layer 76 has been decreased from 16.1 nm to 14.1 nm and the thickness of fourth layer 75 has been increased from 30.5 nm to 35.2 nm compared with corresponding layers of Table 5.

Figure 12:
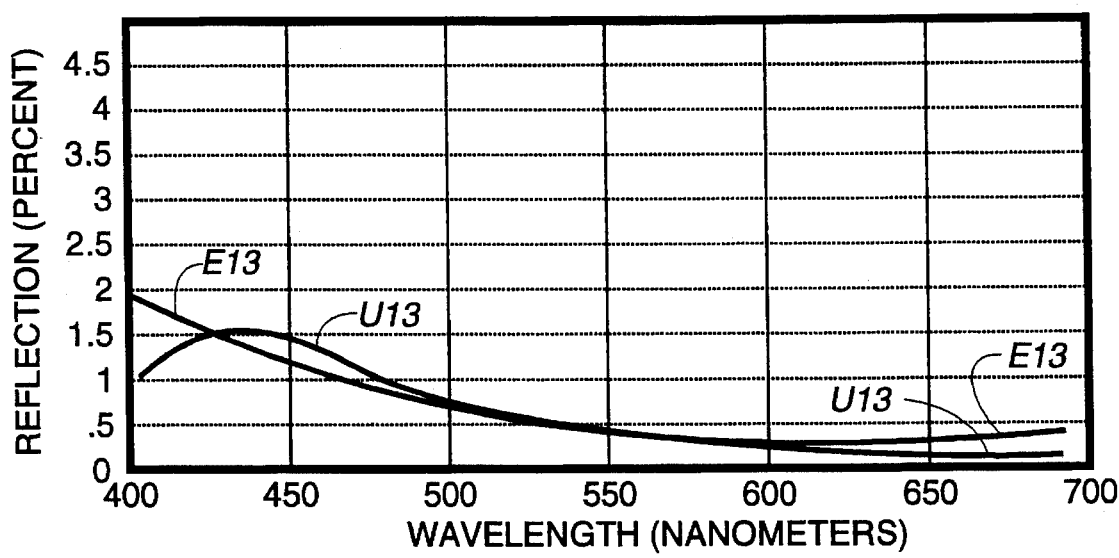
FIG. 12 is a graph schematically illustrating computed reflection as a function of wavelength for the etched an un-etched portions of another example of the coating of FIG. 11 wherein the coating is configured such that spectral responses of etched and un-etched portions substantially match in wavelength range between about 450 and 650 nm.

The result of the layer thickness modification is illustrated in FIG. 12, wherein curve U13 depicts the computed spectral response (reflection as a function of wavelength) of the first through fifth layers (groups 80 and 82) together of Table 6 and curve E13 depicts the spectral response of the fifth and fourth layers 76 and 74 (group 80) only.

TABLE 6

| Layer No. | Material | Thickness |
| --- | --- | --- |
| 1 | $Si_xN_y$ | 23.3 nm |
| 2 | $SiO_2$ | 23.3 nm |
| 3 | ITO | 134.4 nm |
| 4 | $SiO_2$ | 35.2 nm |
| 5 | $Si_xN_y$ | 14.1 nm |

The substantial match of the spectral responses in the region from about 470 nm to 650 nm is evident from the illustration. Not surprisingly, the match of photopic reflection and color values is excellent. The computed photopic reflection of curve E3 is about 0.43 percent and the computed photopic reflection of curve U13 is about 0.44 percent. CIE (Commission Internationale d'Éclairage) 1931 coordinates (for Illuminant A) are x=0.203 and y=0.182 for curve E13 and x=0.205 and y=0.176 for curve U13.

The layer thicknesses of Table 6 were computed by the following, non-limiting, method. First, in a layer system comprising only layers 74, 75, and 76, and wherein the thickness of layer 74 was fixed at an optical thickness of about one-half wavelength at a wavelength of about 520 nm, thicknesses for layers 76 and 75 were computed which would provide the lowest reflection (in liquid 56) over the visible spectrum.

Next, values of reflection versus wavelength over the spectral region between 440 and 660 nm of layers 76 and 75 alone were computed. From these computed reflection versus wavelength values, values in the spectral range from about 440 to 660 nm at 20 nm intervals (including extrema) were selected as optimizing target values for five-layer coating 70.

Finally, with the thickness of layers 75 and 76 fixed at the first computed values, the values of layers 72–74 were computer optimized until an acceptable match with the optimizing target values was obtained in the range from 440 to 660 nm. The optimizing range is selected to be slightly wider than the range from 470 to 650 nm in order to prevent significant differences in reflection from occurring outside this range. Such significant differences may cause detectable color difference between etched and un-etched areas, particularly if reflection within the range is low relative to reflection outside the range.

Before proceeding with a description of further examples of reflection and color matching in etched and un-etched coatings according to the present invention, the following should be noted.

First, (with reference again to FIG. 9) in the foregoing description, groups 80 and 82 of coating 70 are described as essentially contiguous at an interface between layers 74 and 75. It will be evident those skilled in the art to which the invention pertains that this need not be the case. In this instance, it is suggested as a practical matter, as the layer interface presents a convenient detectable location at which to terminate etching. Etching could of course proceed part way through layer 75, in effect placing a portion of layer 75 in group 80 and a portion of the remainder in group 82. There does not appear, however to be a compelling reason for doing this.

Further, it is possible in theory at least to form layer 75 from a material which matches the refractive index of liquid 56 in which the coating is to be immersed. Silicon oxynitride ($Si_xO_yN_z$) for example may be reactively sputter deposited with a specific refractive index between the refractive index of silicon dioxide and the refractive index of silicon nitride. The refractive index of the $Si_xO_yN_z$ may be varied by varying proportions of oxygen and nitrogen in a reactive sputtering gas mixture.

When the refractive index of layer 75 matches the refractive index of liquid 56, the spectral response of group 80 alone would be determined by layer 76 alone. This would permit the thickness of layer 75 to be included, in effect, in group 82, and varied in thickness together, with other layers in the group, for spectral response matching purposes. Layer 75 could also be partially etched without affecting the accuracy of color and reflection matching in etched and un-etched areas.

Matching spectral response of etched and un-etched areas of an electrode may be accomplished with a somewhat simpler layer system than the layer system of coating 70, albeit not quite as effectively.

Figure 13:
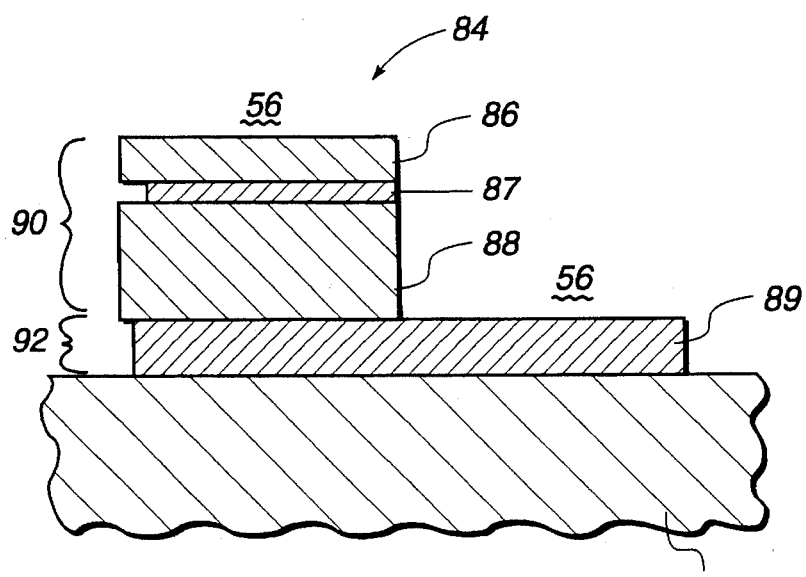
FIG. 13 schematically illustrates etched and un-etched portions of one example of a four-layer coating in accordance with the present invention.

In FIG. 13, for example, is illustrated a four layer system 84 including first through fourth layers 86–89. An electrode forming group 90 includes three layers, i.e., layers 86, 87, and 88. Layer 86, furthest from substrate 22, has a refractive index between about 1.62 and 2.65 at a wavelength of about 520 nm. Layer 87, adjacent layer 86, has a refractive index between about 1.35 and 1.62 at a wavelength of about 520 nm. Layer 88 is a layer of an electrically-conductive transparent material having a refractive index between about 1.8 and 2.2 at a wavelength of about 520 nm and having an optical thickness between about one-sixteenth wavelength and three wavelengths of visible light. Preferably layer 88 has an optical thickness between about one-tenth wavelength and one wavelength of visible light. Layers 86 and 87 have a combined optical thickness less than one-quarter wavelength of visible light.

Electrode forming group 90 is deposited on a barrier or insulator forming group 92 comprising layer 89. Layer 89 has a refractive index between about 1.35 and 2.2 at a wavelength of about 520 nm. Specifically layer 89 should have a refractive index less than the refractive index of layer 88, preferably between the refractive index of the substrate and the refractive index of transparent conductive layer 88. Layer 89 preferably has an optical thickness of about one quarter wavelength of visible light. The thickness of layer 86, 87, and 88 is arranged such that the spectral response of groups 90 and 92 combined substantially matches the spectral response of group 92 alone in a wavelength range at least between about 470 and 650 nm.

Table 7 shows details of the structure of an example of layer system 84, wherein fourth layer 89 is formed from silicon oxynitride having a refractive index of about 1.72 at a wavelength of about 520 nm, electrically conductive layer 88 is formed from ITO, layer 87 is formed from silicon dioxide and layer 86 is formed from silicon nitride. Liquid 56 is assumed to have a refractive index of about 1.445.

TABLE 7

| Layer No. | Material | Thickness |
|---|---|---|
| 1 | $Si_xN_y$ | 27.7 nm |
| 2 | $SiO_2$ | 35.0 nm |
| 3 | ITO | 124.8 nm |
| 4 | $Si_xO_yN_z$ | 75.0 nm |

Figure 14:
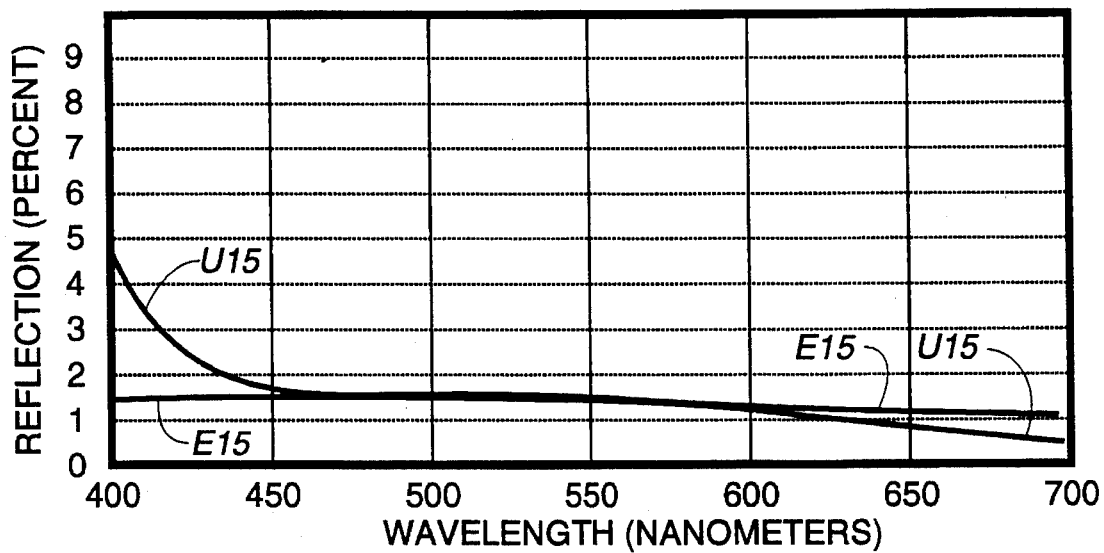
FIG. 14 is a graph schematically illustrating computed reflection as a function of wavelength for the etched an un-etched portions of one example of the coating of FIG. 14.

FIG. 14 shows the spectral response (E15) of fourth layer 89 alone, and the spectral response (U15) of first through fourth layers 86–89 in combination.

It can be seen that spectral responses E15 and U15 substantially match in at least in the wavelength region between about 470 and 650 nm. The computed photopic reflection of curve E15 is about 1.35 percent and the computed photopic reflection of curve U15 is about 1.32 percent. CIE 1931 coordinates (for Illuminant A) are x=0.286 and y=0.304 for curve E15 and x=0.273 and y=0.282 for curve U15.

Table 8 shows structural details of another example of coating 70 (see FIG. 11) wherein third layer 74 is a layer of ITO having a thickness of about 25 nm, i.e., an optical about one-tenth wavelength of visible light. Such a coating is suitable for small displays, wherein transparent electrodes having a sheet resistance between about 100 Ω/sq and 200 Ω/sq may provide adequate performance.

TABLE 8

| Layer No. | Material | Thickness |
|---|---|---|
| 1 | $Si_xN_y$ | 20.7 nm |
| 2 | $SiO_2$ | 50.1 nm |
| 3 | ITO | 25.0 nm |
| 4 | $SiO_2$ | 50.2 nm |
| 5 | $Si_xN_y$ | 9.9 nm |

Figure 15:
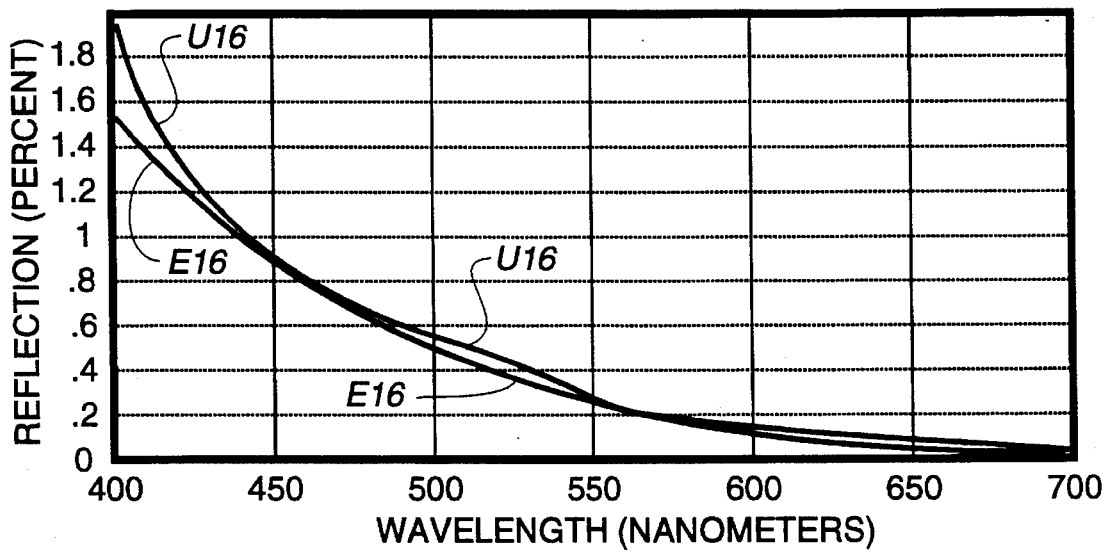
FIG. 15 is a graph schematically illustrating computed reflection as a function of wavelength for the etched an un-etched portions of yet another example of the coating of FIG. 11.

In FIG. 15 is shown the spectral response E16 of an etched portion (group 80) including the fourth and fifth layers, and the spectral response U16 of all five layers (groups 80 and 82 in combination). It can be seen that spectral responses substantially match at least across at the entire wavelength range between about 470 and 650 nm. Indeed, the spectral responses match across the entire visible spectrum between about 425 and 675 nm.

The computed photopic reflection of curve E16 is about 0.28 percent and the computed photopic reflection of curve U16 is also about 0.28 percent. CIE 1931 coordinates (for Illuminant A) are x=0.192 and y=0.176 for curve E16 and x=0.183 and y=0.182 for curve U16.

Figure 16:
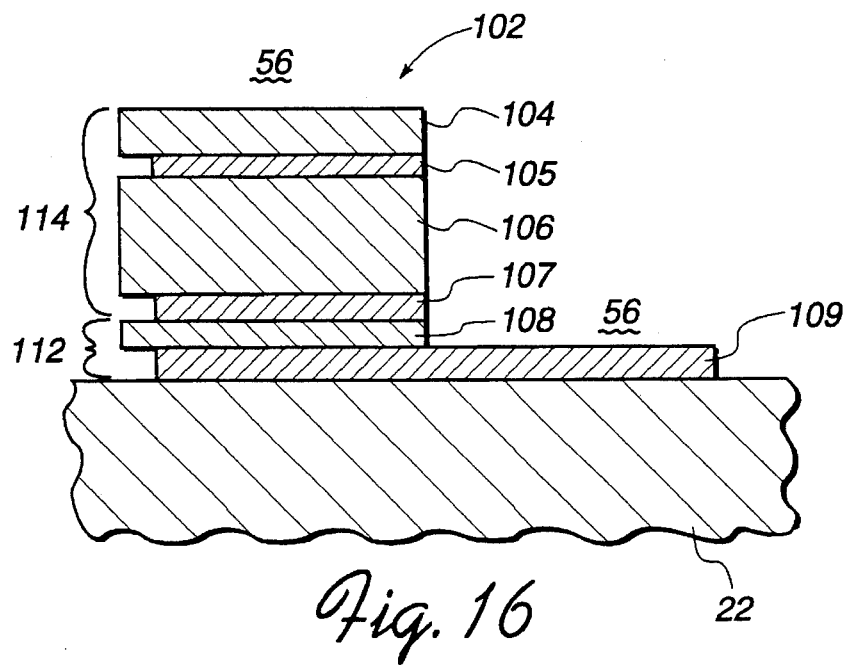
FIG. 16 schematically illustrates etched and un-etched portions one example of a six-layer coating in accordance with the present invention.

FIG. 16 illustrates another embodiment 102 of a coating in accordance with the present invention. Here, coating 102 includes first through sixth layers 104–109. Layer 109 forms a barrier group 112, and layers 104–108 form an electrode forming group 114. Layers 104–108 are specified generally in the same manner as layers 72–76 of coating 70 (see FIG. 11). Layer 109 preferably has a thickness of about 20.0 nm or greater and has a refractive index between about 1.35 and 2.2 at wavelength of about 520 nm. Preferably, the refractive index of layer 109 is less than the refractive index of layer 108.

Table 9 shows structural details of an example of coating 102 wherein sixth layer 109 is a layer of silicon dioxide about 25.0 nm thick. First and fifth layers 104 and 108 are assumed to be formed from silicon nitride, second and fourth layers 105 and 107 are assumed to be formed from silicon dioxide, and third (electrically-conductive transparent) layer 106 is assumed to be formed from ITO. The thickness of layers 104–108 is selected such that all six layers 104–109 together will produce a minimum reflectivity across the visible spectrum.

TABLE 9

| Layer No. | Material | Thickness |
|---|---|---|
| 1 | $Si_xN_y$ | 16.0 nm |
| 2 | $SiO_2$ | 24.7 nm |
| 3 | ITO | 141.5 nm |
| 4 | $SiO_2$ | 30.5 nm |
| 5 | $Si_xN_y$ | 16.1 nm |
| 6 | $SiO_2$ | 25.0 nm |

TABLE 10

| Layer No. | Material | Thickness |
|---|---|---|
| 1 | $Si_xN_y$ | 23.3 nm |
| 2 | $SiO_2$ | 23.3 nm |
| 3 | ITO | 134.4 nm |
| 4 | $SiO_2$ | 38.8 nm |
| 5 | $Si_xN_y$ | 11.7 nm |
| 6 | $SiO_2$ | 25.0 nm |

Table 10 shows details of another example of coating 102 wherein layers in the coating have the same materials as corresponding layers of Table 9. Layer 109 is maintained as a layer of silicon dioxide having a thickness of about 25.0 nm. In Table 10, the thickness of layers 104–108 is selected such that all six layers 104–109 together will provide a spectral response which substantially matches the spectral response of layer 109 alone at least in the wavelength range between about 470 and 650 nm. Refractive index of liquid 56 in Tables 9 and 10 is assumed to be about 1.62 at a wavelength of about 520

Figure 17:
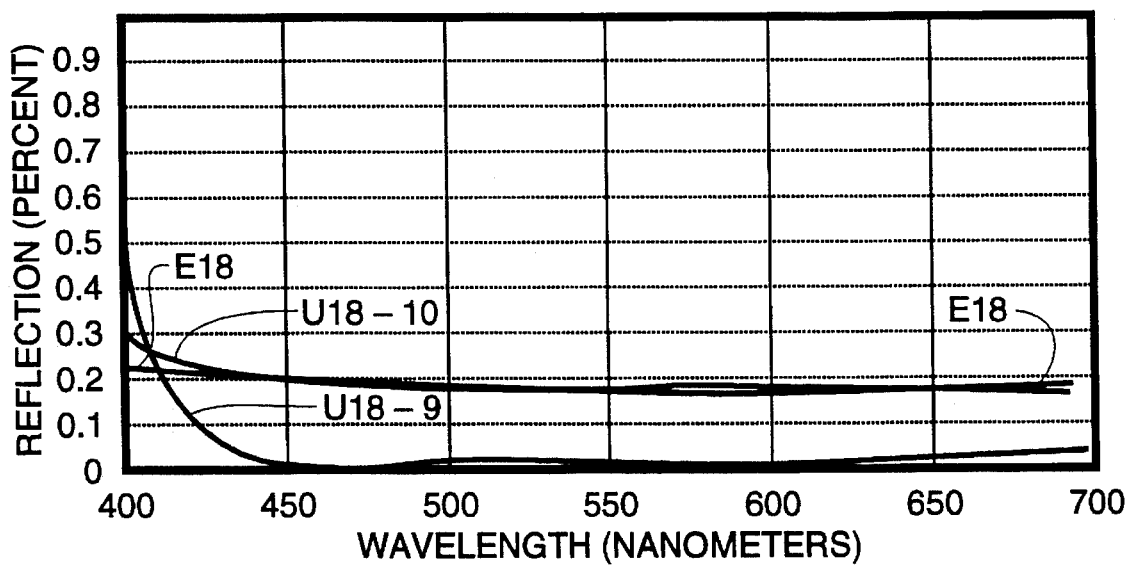
FIG. 17 is a graph schematically illustrating computed reflection as a function of wavelength for the etched an un-etched portions of two examples of the coating of FIG. 17.

FIG. 17 shows the computed spectral response E18 of layer 109 (group 112) alone, the spectral response U18-9 of all six layers of Table 9, and the spectral response U18-10 of all six layers of Table 10.

It can be seen that the presence of barrier layer 109 dos not prevent layer system 102 from providing an extremely low photopic reflection of about 0.02 percent. It can also be seen that an extremely good photopic reflection and spectral match is possible between etched and un-etched areas of the coating.

Those skilled in the art to which the present invention pertains will realize that in practical devices it will be extremely unlikely that the refractive indices of substrate 22, barrier layer 109, and liquid 56 will match, and thus provide essentially zero reflection from layer 109. Only with such a match may coating 102 may be configured to provide the extremely low reflections exemplified by curve U18-9 while still providing an essentially undetectable electrode pattern.

By using an appropriate composition of $Si_xO_yN_z$ to form barrier layer 109, the refractive index of the layer may be made to match either the index of the glass or an index of liquid 56. Nevertheless, given the usual values of refractive index for practical liquids and glasses, photopic reflection from the barrier layer alone may be expected to be at least about 0.1 percent.

From the foregoing it will be evident that reflection matching between etched and un-etched areas is possible with five layer embodiments of a coating according to the present invention, generally specified in the manner of coating 70 and wherein the coating is etched completely through to the substrate.

Figure 18:
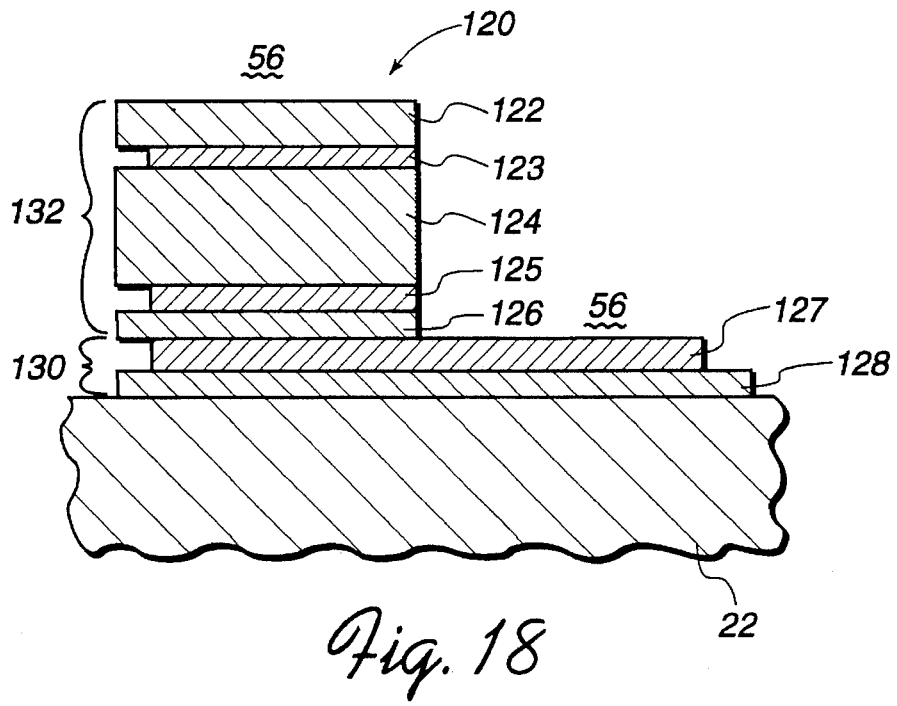
FIG. 18 schematically illustrates etched and un-etched portions of another example of a seven-layer coating in accordance with the present invention.

Referring now to FIG. 18, at least a photopic reflection match between etched an un-etched areas of a transparent conductive coating may be obtained by means of a seven-layer embodiment 120 of a coating in accordance with the present invention.

Coating 120 includes first through seventh layers 122–128. Sixth and seventh layers 127 and 128 form a barrier layer group 130, and first through fifth layers 122–126 form an electrode forming group 132. First through fifth layers 122–126 are specified generally in the same manner as layers 72–76 of coating 70 (see FIG. 11). Sixth layer 127 has a refractive index between about 1.35 and 1.62, preferably less than the refractive index of fifth layer 126. Seventh layer 128 has a refractive index between about 1.62 and 2.65, preferably greater than the refractive index of sixth layer 127. The combined optical thickness of layers 127 and 128 is less than one-quarter wavelength of visible light A preferred method of formulating coating 120 is to select materials for sixth and seventh layers 127 and 128 and then compute thicknesses for the layers that will provide the lowest reflectivity across the visible spectrum when only these two layers are immersed in liquid 56. Then, with the thickness of layers 127 and 128 fixed at the computed values, thicknesses for first through fifth layers 122–126 are computed which will provide the lowest reflectivity across the visible spectrum when they are deposited on layers 127 and 128.

Table 11 shows structural details of one example of coating 120 wherein: first, fifth and seventh layers 122, 126, and 128 are assumed to be formed from silicon oxynitride; second, fourth, and sixth layers 123, 125, and 127 are assumed to be formed from silicon dioxide; and third layer 124 is assumed to be formed from ITO and has an optical thickness of about one-half wavelength of visible light.

TABLE 11

| Layer No. | Material | Thickness |
| --- | --- | --- |
| 1 | $Si_xN_y$ | 17.8 nm |
| 2 | $SiO_2$ | 24.9 nm |
| 3 | ITO | 144.7 nm |
| 4 | $SiO_2$ | 24.7 nm |
| 5 | $Si_xN_y$ | 17.4 nm |
| 6 | $SiO_2$ | 29.2 nm |
| 7 | $Si_xN_y$ | 5.2 nm |

Figure 19:
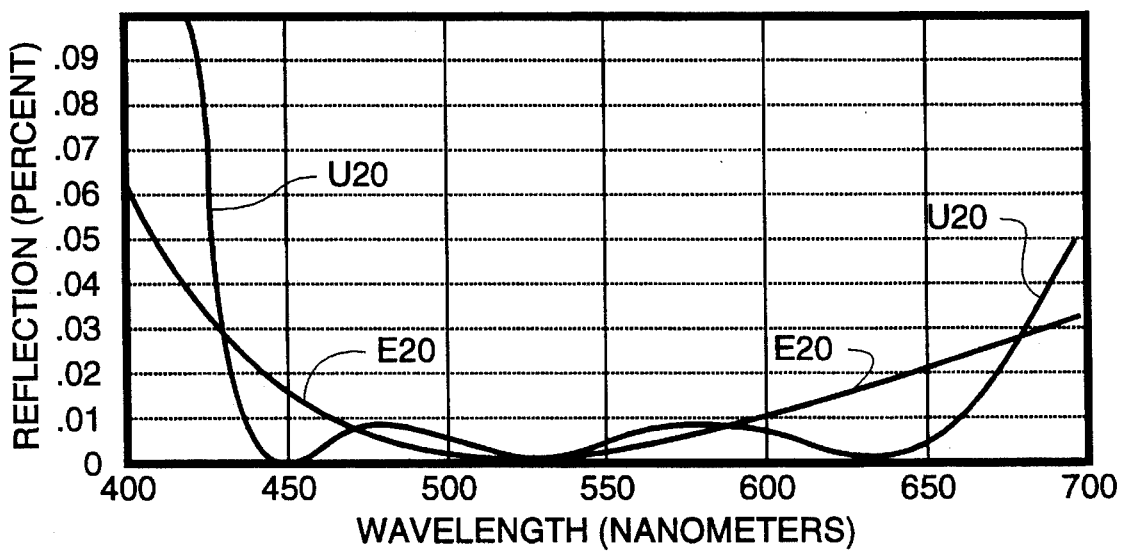
FIG. 19 is a graph schematically illustrating computed reflection as a function of wavelength for the etched an un-etched portions of one examples of the coating of FIG. 19.

FIG. 19 shows the computed spectral response E20 of layers 127 and 128 (group 130) alone and the spectral response U20 of all seven layers of Table 11. The computed photopic reflection of curve E20 is about 0.006 percent and the computed photopic reflection of curve U20 is about 0.005 percent. CIE 1931 coordinates (for Illuminant A) are x=0.326 and y=0.155 for curve E20 and x=0.242 and y=0.135 for curve U20. The reflection values match within 20 percent and the reflection colors sufficiently similar (purplish-blue and purple) that, particularly in view of the extremely low absolute reflection values etched and un-etched areas will be essentially undetectable even under relatively bright lighting conditions. It is believed that if photopic reflectivity of both etched and un-etched areas is less than 0.1 percent, the areas will not be distinguishable from each other under normal lighting conditions, even if some color difference between the two areas exists. The spectral responses of the two areas may thus be considered substantially matched even if the spectral responses did not meet the previously-discussed criterion for matching in the range between 500 and 600 nm.

In all of the examples of coatings for reflection and color matching of etched and un-etched areas given above there are common design and structural features.

All are designed to be immersed in, or at least in optical contact with, a liquid having a refractive index between about 1.3 and 1.7.

As they are intended to function as low-loss transparent electrodes, all include a transparent electrically-conductive metal oxide layer which functions as the principle conductor in the electrode.

All examples include, at least two layers on the side of this transparent electrically-conductive metal oxide layer furthest from the substrate. A first of these layers has a refractive index between about 1.62 and 2.65. This layer may be formed from an electrically-conductive transparent material but such is not necessary to provide a particular optical property of the coating. A second of these layers has a refractive index between about 1.35 and 1.62. The first and second layers have a combined optical thickness not greater than one quarter wavelength of visible light.

All examples include at least one layer on the side of the transparent electrically-conductive layer closest to the substrate for forming an insulating barrier layer on the substrate.

The thickness of the layers may be arranged such that when a predetermined number of the original number of layers, including the transparent conductive layer, is removed from the coating, the remaining layers in the coating will have a spectral response which substantially matches the spectral response of the original number of layers at least over a wavelength range between about 470 and 650 nm.

As noted above, a match is possible if a layer is partially (in thickness) removed and some fractional number of layers remains. Similarly a match is possible or if all of the layers are removed and the match is made with the spectral response of a substrate/liquid interface. Accordingly, for purposes of this description and the appended claims, the remaining number of layers is not limited to an integer number of layers, and may be zero.

It should be noted that there may be more than two layers located on the liquid side of the transparent conductive layer, for example, as illustrated in FIG. 6. However that when more than two layers are located on the liquid side of the substrate, the total optical thickness of all such layers is preferably not greater than one quarter wavelength of visible light.

In summary, construction of an electrically-conductive transparent coating providing a low optical loss transparent electrode for electrically responsive liquid cells has been described.

One advantageous feature of the electrically-conductive transparent coating of the present invention is that photopic reflectivity less than about 0.25 percent may be achieved, even when the layer system includes a transparent conductive layer having an optical thickness of as little as one-sixteenth or as great as three wavelengths of visible light. A layer system including a transparent conductive layer having an optical thickness of two-and-one-half wavelengths provided a photopic reflectivity of about 0.16%. The present invention thus allows a thick layer to be used to produce a coating having a low sheet resistance, for example, between about 2 Ω/sq and 100 Ω/sq., while maintaining a relatively insignificant reflection value.

When a transparent conductive layer in the coating has an optical thickness between about one-tenth and six-tenths of a wavelength of visible light, the coating may have a photopic reflectivity of less than 0.01 percent.

Yet another, non exhaustive, advantageous feature of the present invention is that layer thicknesses of the coating may be selected such that when some proportion of an original number of layers in the coating are removed, for example, by etching, to form an electrode pattern, the remaining number of layers has a photopic reflection which matches the photopic reflection of the original number of layers. Layer thickness may also be arranged such that there is a reflection color match between the remaining and original number of layers.

The present invention has been described in terms of a preferred embodiment and a number of other embodiments. The invention however is not limited to the embodiments described and depicted. Rather, the scope of the invention is defined by the appended claims.

What is claimed is:

1. In a coated substrate the substrate having a surface coated by an insulating layer, and having a plurality of spaced-apart transparent electrodes formed on the insulating layer and exposing the insulating layer therebetween, the electrodes and the exposed insulating layer therebetween configured to be immersed in a selected liquid, the invention characterized in that:

each of the electrodes include three layers, each of said three layers having an extinction coefficient less than 0.10 at about 520 nanometers, any adjacent two of said three layers having a different refractive index, and said three layers designated as first second and third layers in consecutive numerical order, said first layer being furthest from the substrate, and said third layer being deposited on said insulating layer;

said first layer has a refractive index between about 1.62 and 2.65 at a wavelength of about 520 nanometers, said second layer has a refractive index between about 1.35 and 1.62 at a wavelength of about 520 nanometers, and said third layer is a layer of an electrically-conductive metal oxide material having a refractive index between about 1.8 and 2.2 at a wavelength of about 520 nanometers and having an optical thickness between about one-sixteenth and one wavelength of visible light;

the insulating layer is designated as a fourth layer and has a refractive index less than the refractive index of the third layer;

said first and second layers each have an optical thickness less than one-sixteenth wavelength of visible light, and said first and second layers have a combined optical thickness less than about one-quarter wavelength of visible light; and the fourth layer alone has a first spectral response in the selected liquid, and the first, second, third, and fourth layers together have a second spectral response in the selected liquid, said first and second spectral responses in the selected liquid substantially matching in a wavelength range between about 470 and 650 nanometers.

2. The coated substrate of claim 1, further characterized in that said fourth layer has an optical thickness of about one quarter-wavelength of visible light, and has a refractive index between the refractive index of the third layer and the refractive index of the substrate.

3. In a coated substrate, the substrate having a surface coated with an insulating coating, and having a plurality of spaced-apart transparent electrodes formed on the insulating coating and exposing the insulating coating therebetween, the electrodes and the exposed insulating coating therebetween configured to be immersed in a selected liquid, the invention characterized in that:

each of the electrodes include three layers, each of said three layers having an extinction coefficient less than 0.10 at about 520 nanometers, any adjacent two of said three layers having a different refractive index, and said three layers designated as first second and third layers in consecutive numerical order, said first layer being furthest from the substrate, and said third layer being adjacent said insulating coating;

said first layer has a refractive index between about 1.62 and 2.65 at a wavelength of about 520 nanometers, said second layer has a refractive index between about 1.35 and 1.62 at a wavelength of about 520 nanometers, said third layer is formed from an electrically-conductive transparent material having a refractive index between about 1.8 and 2.2 at a wavelength of about 520 nanometers and has an optical thickness between about one-sixteenth wavelength and three wavelengths of visible light, and said first and second layers each have an optical thickness greater than one-sixteenth of a wavelength of visible light and have a combined optical thickness less than one-quarter wavelength of visible light;

the insulating coating includes two layers designated as fourth and fifth layers, said fourth layer adjacent said third layer and having a refractive index between about 1.35 and 1.62 at a wavelength of about 520 nm, and said fifth layer having a refractive index between about 1.62 and 2.65, and said fourth and fifth layers each having a thickness greater than one-sixteenth wavelength of visible light and having a combined optical thickness less than about one quarter wavelength of visible light; and said fourth and fifth layers alone having a first spectral response in the selected liquid, and said first, second, third, fourth, and fifth layers together having a second spectral response in the selected liquid, and said first and second spectral responses substantially matching in a wavelength range between about 470 and 650 nanometers.

* * * * *